United States Patent
Townsend et al.

(10) Patent No.: US 6,541,950 B2
(45) Date of Patent: Apr. 1, 2003

(54) MULTIPATH METER

(75) Inventors: Bryan Townsend, Calgary (CA); Jonathan Wiebe, Calgary (CA); Andy Jakab, Calgary (CA)

(73) Assignee: Novatel, Inc., Calgary (CA)

(*) Notice: Subject to any disclaimer, the term of this patent is extended or adjusted under 35 U.S.C. 154(b) by 0 days.

(21) Appl. No.: 09/768,092

(22) Filed: Jan. 23, 2001

(65) Prior Publication Data
US 2002/0036585 A1 Mar. 28, 2002

Related U.S. Application Data
(60) Provisional application No. 60/178,115, filed on Jan. 26, 2000.

(51) Int. Cl.[7] ............. G01S 3/02; G01R 29/26; H04Q 2/20
(52) U.S. Cl. ............. 324/76.14; 324/613; 342/457; 455/456
(58) Field of Search ............. 324/76.14, 76.56, 324/613, 614, 620; 375/148, 141; 342/363, 457, 360; 455/65, 66, 456

(56) References Cited

U.S. PATENT DOCUMENTS

| | | | | |
|---|---|---|---|---|
| 5,615,232 A | * | 3/1997 | Van Nee | 375/150 |
| 5,692,008 A | * | 11/1997 | Van Nee | 342/357.03 |
| 5,781,152 A | * | 7/1998 | Renard et al. | 342/357.08 |
| 5,995,044 A | * | 11/1999 | Kunysz et al. | 342/363 |

OTHER PUBLICATIONS

Van Nee, Richard, "Optimum DGPS Receiver Structures", Proceedings of the 2nd International Symposium on Diufferential Satellite Navigation Systems, Amsterdam, Netherlands, Mar. 30–Apr. 2, 1993.

(List continued on next page.)

*Primary Examiner*—Christine Oda
*Assistant Examiner*—James Kerveros
(74) *Attorney, Agent, or Firm*—Cesari and McKenna, LLP

(57) ABSTRACT

The invention is a multipath meter that analyses estimates of parameters associated with a direct signal component and one or more multipath signal components of a signal received by an antenna. The meter analyses the parameter estimates in order to facilitate the select of a location for an antenna, monitor signal quality at an existing antenna site, and/or to determine if satellite failure or some other type of signal failure has occurred. The multipath meter makes available to a user or for analysis information related to the contributions of the direct signal and the multipath signals to the received signal. The information includes estimates of various parameters such as delay, relative amplitude and phase of the direct and multipath signals. The meter calculates a ratio of the amplitudes of the direct and the multipath signals, to determine the severity of the multipath signals and, thus, the signal quality. The same ratio values may also be used to determine the advisability of the associated location as an antenna site. The meter further calculates multipath corrected correlator values and estimation residual values, to determine how well the receiver compensates for the multipath signals. The meter can then determine if the site and/or signal quality corresponds to a condition in which "excessive" multipath signals are introduced into the received signal, that is, a condition that is associated with rather substantial tracking errors. The meter further calculates normalized error ratios and normalized error values for selected correlators used by the receiver to produce the estimates of the signal parameters. Based on these ratios and values, and the determination of signal quality the meter determines if a satellite failure or other signal failure has occurred.

18 Claims, 4 Drawing Sheets

OTHER PUBLICATIONS

Townsend, Van Nee, Van Dierendonck, and Fenton, "L1 Carrier Phase Multipath Error Reduction Using MEDLL Technology", Proceedings of the 8th International Technical Meeting of the Satellite Division of the Institute of Navigation, Palm Springs, CA, USA (1995).

Falkenberg, Ford, NG and Van Dierendonck, "NovAtel's GPS Receiver: The High Performance OEM Sensor of the Future", Proceedings of the 4th International Technical Meeting of the Institute of Navigation, Albuquerque, NM USA (1991).

Cox, Shallberg, and Manz, "Definition and Analysis of WAAS Receiver Multipath Error Envelopes", Journal of the Institute of Navigation, USA, vol. 46, No. 4, Winter 1999–2000, pp. 271–282.

Townsend, Van Nee, Van Dierendonck, Fenton, "Performance Evaluation of the Multipath Estimating Delay Lock Loop", Proceedings of the Institute of Navigation National Technical Meeting 1995, Anaheim, CA, USA.

Townsend and Fenton, "A Practical Approach to the Reduction of Pseudorange Multipath Errors in a L1 GPS Receiver", Proceedings of the 7th International Technical Meeting of the Satellite Division of the Institute of Navigation, Salt Lake City, UT, USA (1994).

Van Dierendonck, Fenton and Ford, "Theory and Performance of Narrow Correlator Spacing in a GPS Receiver", Journal of the Institute of Navigation, USA, vol. 39, No. 3, Fall 1993, pp. 265–283.

Townsend, Wiebe and Jakab, "Results and Analysis of Using the MEDLL Receiver as a Multipath Meter", Proceedings of the Institute of Navigation Technical Meeting 2000, Anaheim, CA USA.

Van Nee, Siereveld, Fenton and Townsend, "The Multipath Estimating Delay Lock Loop: Approaching Theoretical Accuracy Limits", Proceedings of the IEEE Position, Location and Navigation Symposium, Las Vegas, NV USA (1994).

\* cited by examiner

MULTIPATH METER

CROSS-REFERENCE TO RELATED APPLICATION

The present application claims priority from U.S. Provisional Patent Application Ser. No. 60/178,115, which was filed on Jan. 26, 2000, by Bryan Townsend, Jonathan Wiebe and Andy Jakab for a MULTIPATH METER and is hereby incorporated by reference.

BACKGROUND OF THE INVENTION

1. Field of the Invention

The invention relates generally to signal receivers and, more particularly, to receivers that distinguish between direct and multipath components of a received signal.

2. Background Information

Various types of receivers, such as GPS receivers, which are used for receiving coded electromagnetic signals emitted by one or more transmitters, are well known. As shown in FIG. 1, the received signals typically include both a line of sight, or direct, signal 21 and one or more signals 23 that are reflected by a surface 26 of an object 25. The object can be a terrestrial structure, various other stationary structures, moving vehicles and the like. Note that while only one reflected signal is shown for clarity, the following discussion applies equally well to situations in which additional reflected signals are present. The direct signal 21 and the reflected signal 23 are incident upon a receiver antenna 11 and are transmitted to a receiver 24.

The receiver 24 cannot distinguish between the direct signal, and the reflected signal that arrives at a slightly later time. The receiver processes the combination of the direct signal and the reflected signal as if it were an undistorted signal, and thus, errors are introduced. The errors are commonly referred to as multipath errors, and the reflected signals are commonly referred to as multipath signals. Multipath signals that are delayed by two or less chips of a PRN code that is included in the direct signal are of particular interest, because a locally-produced PRN code at the receiver partially correlates to these signals.

One method of avoiding the multipath signals is to use a highly-directional antenna that is precisely oriented to receive the direct signal and not the multipath signals. However, if the desired signal originates in a moving transmitter, such as a satellite 27, use of a directional antenna is not practical. In such cases, is becomes desirable to locate the receiver antenna 11 in a location away from the surfaces 26 that produce the multipath signals 23.

Conventionally, a location for the receiver antenna 11 is selected by visually inspecting the proposed physical antenna site and placing the antenna at a location that is perceived to contain the fewest sources of multipath signals. As can be appreciated, such a visual assessment is qualitative and will not always produce reliable or consistent results. What is needed is a mechanism for making a quantitative assessment of possible locations. Further, for existing locations, what is needed is a mechanism for quantitatively assessing signal quality in environments in which multipath signals may be intermittently introduced, such as when objects move onto or off of the antenna site or nearby environs, or when the signals received from satellites in particular orientations are more adversely affected by the multipath signals.

Another source of error in signal correlation is satellite failure. A satellite is operating in a failure mode when it produces anomalous signals, such as in which code chip transitions induce ringing, the transitions lead or lag expected transition times, and so forth. The receiver processes these signals in the usual manner and produces correlation functions that are distorted, such as functions with flat or multiple correlation peaks. The receiver then attempts to track the received signal based on the distorted correlation functions, and substantial tracking errors may occur. Presently, satellite failures are detected by analyzing the correlation functions over time. The satellite failures are difficult to detect in an environment that includes certain multipath sources, however, because of the inherent distortion of the correlation function that is attributable to the multipath signals. Accordingly, what is needed is a mechanism that quantitatively determines when the received signal is distorted in a manner that is associated with substantial tracking errors.

SUMMARY OF THE INVENTION

The invention is a multipath meter that analyses estimates of parameters associated with a direct signal component and one or more multipath signal components of a signal received by an antenna. The meter analyses the parameter estimates in order to facilitate the select of a location for an antenna, monitor signal quality at an existing antenna site, and/or to determine if satellite failure or some other type of signal failure has occurred.

In brief summary, the multipath meter makes available to a user or for analysis information related to the contributions of the direct signal and the multipath signals to the received signal. The information includes estimates of various parameters such as delay, relative amplitude and phase of the direct and multipath signals. The meter calculates a ratio of the amplitudes of the direct and the multipath signals, to determine the severity of the multipath signals and, thus, the signal quality. The same ratio values may also be used to determine the advisability of the associated location as an antenna site. The meter further calculates correlator residual values, as discussed in more detail below, to determine how well the receiver compensates for the multipath signals. The meter can then determine if the site and/or signal quality corresponds to a condition in which "excessive" multipath signals are introduced into the received signal, that is, a condition that is associated with rather substantial tracking errors.

The meter also calculates normalized error ratios and normalized error values for selected correlators used by the receiver to produce the estimates of the signal parameters. Based on these ratios and values, and the determination of signal quality the meter determines if a satellite failure or other signal failure has occurred, as discussed in more detail below.

The meter makes its calculations in real time for signal quality monitoring and signal failure detection. The meter also retains the calculated values, or certain of the values, and plots the values over time so that a user can review them to determine the desirability of a particular location as an antenna site.

BRIEF DESCRIPTION OF THE DRAWINGS

The invention description below refers to the accompanying drawings, of which.

DETAILED DESCRIPTION OF AN ILLUSTRATIVE EMBODIMENT

A mechanism for reducing multipath errors is discussed in U.S. Pat. Nos. 5,615,232 and 5,692,008, which are incorporated herein by reference. The mechanism essentially determines the contributions of the multipath signals to the received signal, and removes these contributions to reproduce the direct signal for further processing by the receiver.

Figure 1:
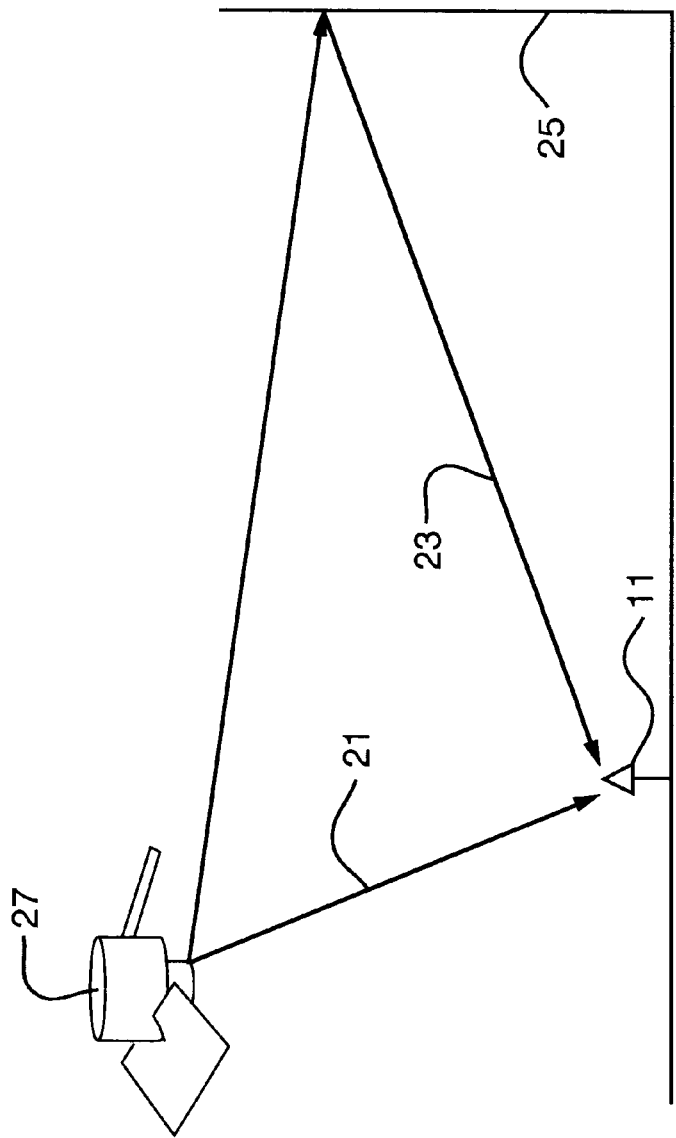
FIG. 1 is a diagrammatical elevational view of a receiving antenna in an environment which includes a direct signal and a multipath signal.
Figure 2:
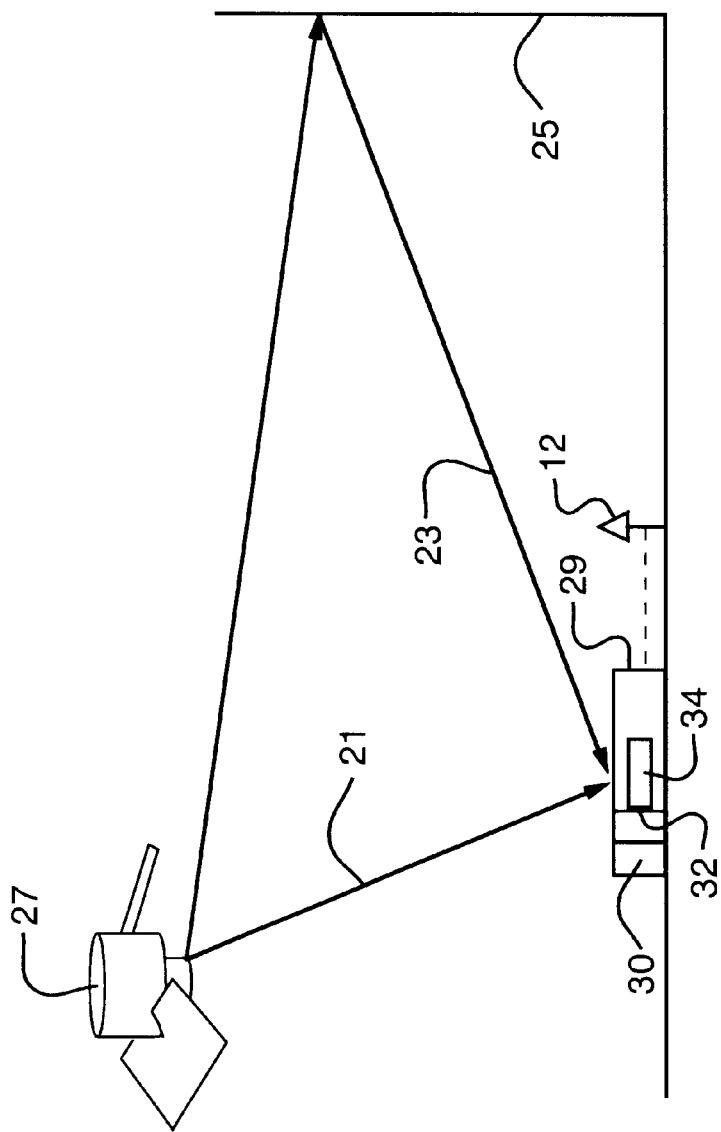
FIG. 2 is a diagrammatical elevational view of a multipath meter emplaced in the environment of FIG. 1.

Referring now also to FIG. 2, a multipath meter 29 operates via a method that in real time provides an indication of the severity of multipath signals, if any, that are included in a signal received from a satellite 27 by an antenna 12. In a first example, the multipath meter 29 is used to evaluate a potential site for the placement of a global positioning system (GPS) receiver antenna 11 (FIG. 1). The multipath meter is thus used to determine if the temporary location of antenna 12 is acceptable as a site for the antenna 11.

The multipath meter 29 separates the signals received by antenna 12 into a direct component and the one or more multipath components by means of a signal processing device 30. The signal processing device defines each component by estimated parameters of amplitude, delay, and phase. An analysis subsystem 32 manipulates the various parameters and calculates associated ratios and residual values, as discussed in more detail below, to assess whether the location is suitable site for the antenna 11.

Figure 3:
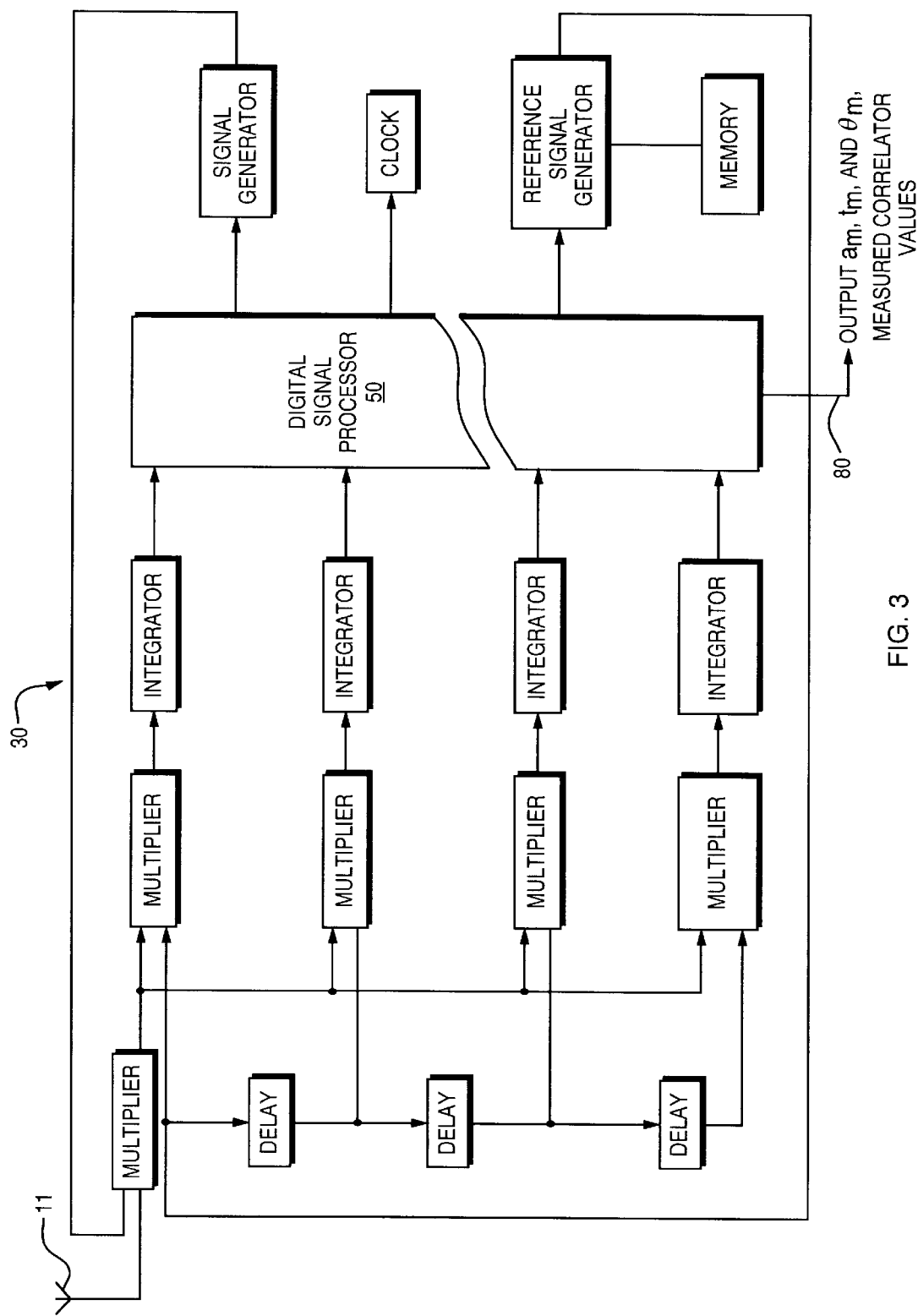
FIG. 3 is a functional block diagram of the multipath meter of FIG. 2.

As seen in FIG. 3, the signal processing device 30 includes a digital signal processor 50. The digital signal processor 50 operates to provide over line 80 estimates of the amplitude ($\alpha_m$), delay ($\tau_m$), and phase ($\theta_m$) of the one or more of the multipath signals 23 received at the antenna 12. Greater detail of the processing device 30 is provided in U.S. Pat. Nos. 5,615,232 and 5,692,008, both of which are incorporated herein by reference in their entireties.

Figure 4:
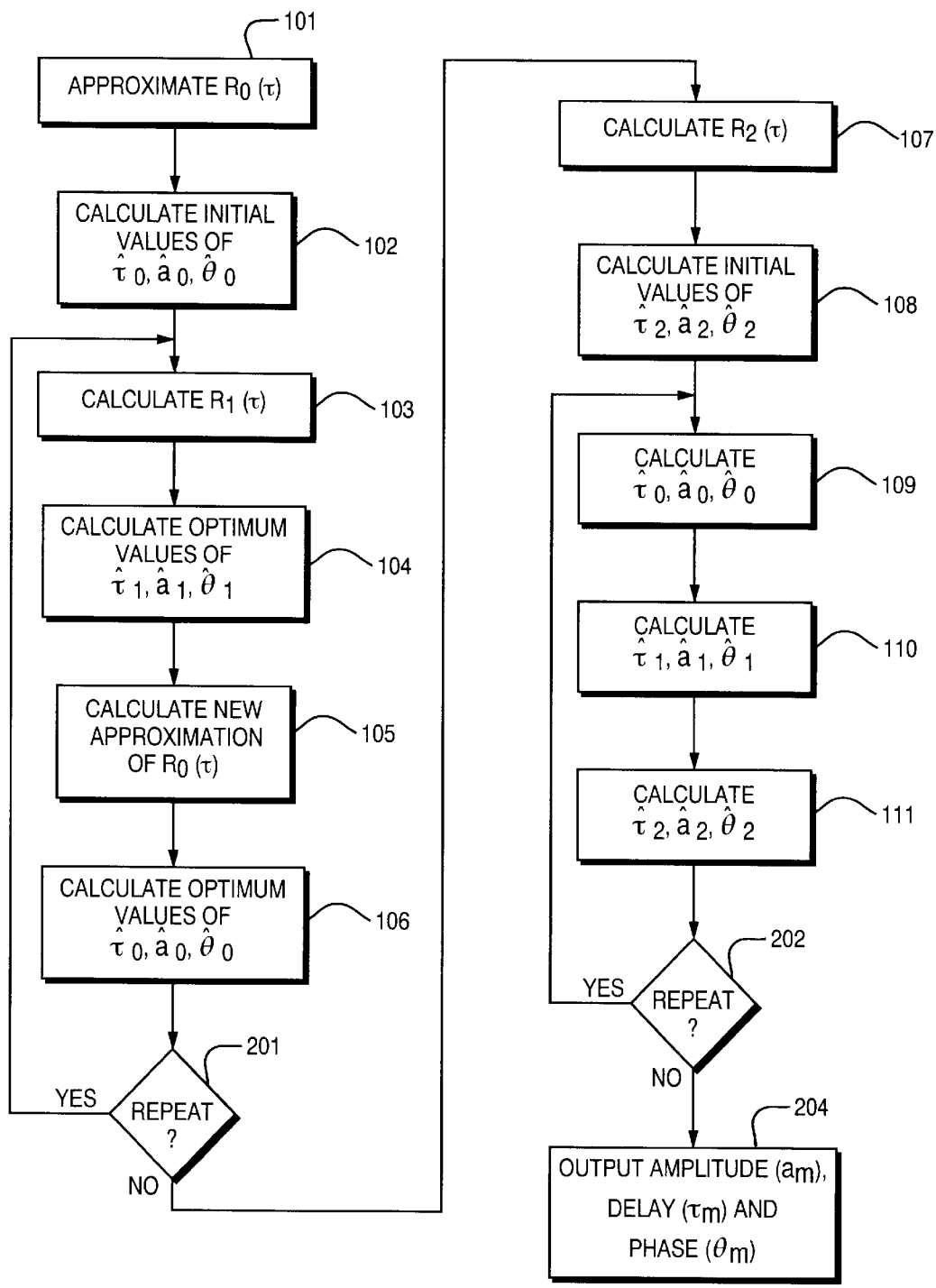
FIG. 4 is a flow chart of the operational steps executed by the multipath meter of FIG. 2.

The processing device 30 essentially calculates the estimates for the various parameters by iteratively solving the equations (4) in the referenced patents. The iterative process is illustrated in the flow diagram of FIG. 4 in which a first peak correlation function $R_0(\tau)$ that is associated with the direct signal is determined at step 101. Initial values of $\hat{\tau}_0, \hat{\alpha}_0, $ and $\hat{\theta}_0$ are also calculated at step 102. A second peak correlation function $R^1(\tau)$ that is associated with a first multipath signal is calculated at step 103. Optimal values of $\hat{\tau}_1, \hat{\alpha}_1,$ and $\hat{\theta}_1$ are also calculated at step 104. A new approximation of the first peak correlation function $R_0(\tau)$ is calculated at step 105. Optimized values of $\hat{\tau}_0, \hat{\alpha}_0$ and $\hat{\theta}_0$ are then calculated at step 106. The steps 103 through 106 are repeated until a suitable stop criterion has been met.

In the case where an estimated contribution for a second multipath signal is to be estimated, an associated third peak correlation function $R_2(\tau)$ is calculated at step 107. Initial values of $\hat{\tau}_2, \hat{\alpha}_2,$ and $\hat{\theta}_2$ are then calculated at step 108, and new values for $\hat{\tau}_0, \hat{\alpha}_0, \hat{\theta}_0$ and for $\hat{\tau}_1, \hat{\alpha}_1,$ and $\hat{\theta}_1$, are calculated at steps 109 and 110, respectively. The processor again calculates the values for $\hat{\tau}_2, \hat{\alpha}_2,$ and $\hat{\theta}_2$ at step 111, and the steps 109 through 111 are repeated until a second stop criterion is met, and so forth, for each multipath signal. Greater detail of the operation of the signal processing device is provided in the incorporated patents.

After the stop criteria have been met, the signal processing 30 provides the amplitude ($\alpha_m$), delay ($\tau_m$), and phase ($\theta_m$), values for the direct signal, m=0, and the one or more of the multipath signals m=1,2 ... to a processor 32 that analyzes the parameters to produce quantitative assessments of signal quality and so forth, as discussed below. The processor 32 may then provide the parameters and/or the values produced for signal quality assessment to a suitable display 34 for interpretation by an operator. In the site survey example, the data are collected for a 24-hour period and a play-back of the associated values and parameters are provided for a more thorough assessment of the multipath environment at the site, as the satellites 27 move into and out of the range of the antenna.

One method used by the meter to assess the severity of the multipath contributions to the received signal at the antenna site is to calculate multipath power as the ratio of direct, or desired, signal power in decibels to multipath, or undesired, signal power in decibels. The meter thus calculates:

$$D/U = 20 * \log(a_{direct}/a_{multipath})$$

A smaller ratio indicates a larger contribution by the multipath signals. Accordingly, a D/U ratio that is consistently below a predetermined minimum threshold indicates that the associated site of antenna 12 is an unacceptable location for the antenna 11.

The meter may also plot the estimated phases of the multipath signals. When the multipath power of a given signal is strong, i.e., the associated D/U ratio is low, the phase starts to follow a sinusoidal curve. The frequency of the curve represents the relative doppler shift between the multipath signal and the direct signal. Accordingly, the meter can provide to the user an indication of how far a reflecting object 25 is from the site of the antenna 12. The user can determine if, for example, the object is a permanent structure or something that is temporarily located at the proposed antenna site.

Evaluating the severity of the multipath signals by comparing the D/U ratio to a predetermined threshold works well for signals with delays of greater than 0.2 chips. For multipath signals with shorter delays, the D/U ratio fluctuates above and below the threshold. Accordingly, the meter may instead analyze the trend of the D/U ratio over the relevant time period, for example, the 24 hours, as part of the site assessment.

To further assess the severity of the multipath signals, the meter may calculate correlator residual values for some or all of the correlators used in the parameter estimation process. A correlator residual value for a given correlator is calculated by subtracting from the measured correlation value the contributions of the direct and the multipath signals. The measured correlation value is the sum of correlation data over a predetermined time, such as one second. The computed direct and multipath correlation values are calculated using the appropriate reference correlation function, which is a predetermined correlation function that is based on an alignment of a locally-produced PRN code and the corresponding PRN code in a direct signal and depends on the characteristic of the receiver. The residual values are thus calculated as:

$$C_{res} = C_{meas} - \sum_{m=0}^{M-1} a_m C_{ref}(x - \tau_m)\cos(\Theta_m)$$

where M-1 is the number of multipath signals used during the iterative process discussed above with reference to FIG. 4.

The correlator residuals are particularly useful is assessing the adverse affects of is multiple multipath signals at a given antenna location, or for determining the timing of multipath events, that is, the times during which "excessive" multipath signals are included in a received signal. Multipath signals are considered excessive when the signal processing device 30 cannot readily compensate for them using the techniques discussed above with reference to FIG. 4.

Correlator residual values consistently above a predetermined threshold value indicate excessive multipath signals. The meter may determine that the signals received from a particular satellite include excessive multipath components when, for example, the satellite is in a particular region of the sky relative to the antenna site. If the sky regions that are associated with the excessive multipath signals are relatively large, the meter or the user may determine that the site is unacceptable for the antenna 11. Conversely, the meter or the user may determine that the site is acceptable if the associated sky regions are relatively small, such as near the horizon.

The meter may also be used to monitor signal quality at previously selected antenna sites. The meter thus analyses the D/U ratios and corresponding correlator residual values to determine the times at which the signals received from the respective satellites correspond to low D/U ratios and/or large correlator residual values. The meter then assigns the associated signals low quality ratings at these times, and the receiver can then, in turn, assign a low confidence rating to the corresponding position measurements. The correlator residual values are separately calculated for each satellite, such that the receiver or the user can assign confidence values to the measurements associated with the respective satellites at various times.

The meter may also display plots of the D/U values and the correlator residual values over time for one or more satellites on the display screen 34. A user can then view the plots, to determine if there were times when one or more multipath sources may have been introduced into the antenna site.

The multipath meter may also be used to detect a satellite failure, that is, the times at which a satellite is transmitting anomalous signals, or other instances of signal failure, such occurrences of excessive multipath signals as discussed above.

There are three satellite failure modes of interest, as defined by the United States Department of Transportation, Federal Aviation Administration in *Specification for Performance Type One Local Area Augmentation System Ground Facility*, FAA-E-2937. One failure mode is a "digital failure mode" in which the times of the rising and/or the falling edges of chip transitions in the transmitted PRN code lead or lag the appropriate times. The receiver processes the received signal in the usual manner, and the result may be correlation values that correspond to an essentially flat correlation peak, which may, in turn, provide multiple tracking regions. A second failure mode produces a "ringing" of the chip transitions and thus the timing of the transitions is ambiguous. Again, the receiver processes the received signal in the usual manner and may produce correlation values that correspond to a distorted correlation peak. A third failure mode is the combination of the first and second types, and the processing of the received signal may result in correlation values that correspond to a flat correlation peak, a distorted correlation peak or multiple correlation peaks.

The multipath meter detects signal failure, that is, satellites operating in the various failure modes or occurrences of excessive multipath signals, using the D/U ratios, the correlator residual values, and one or both of a set of minimum detectable error (MDE) values and a set of minimum detectable ratio (MDR) values. The meter calculates the MDE value as the direct signal component correlator value associated with a particular correlator normalized by the corresponding correlator value at a punctual or peak correlator. The MDR value is the ratio of the tracking errors of correlator pairs at various positions relative to the correlation peak. The meter calculates the direct signal component correlator values, or $C_{DIRECT}$, by calculating $$C_{DIRECT} = C_{ref}(X - \tau_0)$$

The meter preferably uses these correlator values, which are corrected for multipath, rather than the uncorrected or measured correlation values, in calculating the MDE and MDR values.

In the absence of signal failure, the MDR and values are relatively low, that is, near zero, and the MDE values for a given correlator are values that are associated with the location of the correlator and the design characteristics of the receiver. The presence of the anomalous satellite signals or excessive multipath signals results in correlator residual values that are relatively high and MDE and MDR values that are higher or lower than expected values, and may result in a D/U ratio that is relatively low.

In an example, the meter determines MDE values associated with correlators located at +0.025 and +0.125 chips. The meter also determines two MDR values for correlators positioned at ±0.025 and ±0.075 chips, and ±0.075 and ±0.125 chips. Based on an analysis of the MDE values, the MDR values, the corresponding D/U ratios and the correlator residual values, the meter detects a signal failure when the MDE, MDR and/or residual values are above predetermined upper thresholds or below predetermined lower thresholds and/or when the D/U ratio is below a predetermined lower threshold.

If, for example, the meter determines that the D/U ratio is negative, the meter detects a signal failure because the ratio indicates that the receiver has estimated that the reflected signal is stronger than the direct signal. A negative D/U ratio occurs when the receiver produces a later correlation peak $R_1$, $R_2$ that is larger than the earliest peak $R_0$.

If the D/U ratio is positive and above an associated predetermined lower threshold, the meter uses the MDR and MDE values associated with correlators positioned both close to the punctual correlator and relatively far from the punctual correlator to determine if a signal failure has occurred. If there are large fluctuations in the MDE, MDR and/or residual values, and/or the values are consistently above upper predetermined thresholds or below predetermined lower thresholds, the meter detects a signal failure condition for the associated satellite. The receiver may then either ignore the signals from the satellite when making position measurements, or assign a low confidence rating to the measurements.

The meter analyses parameters associated with direct and multipath components of a received signal in real time. Based on the analysis, the meter monitors signal quality and/or detects signal failures and/or to allow a receiver to assign confidence values to associated position measurements. The meter can also analyze the parameters over a predetermined time period, to determine when excessive multipath signals are presented at a proposed antenna site as part of a site survey.

What is claimed is:

1. A meter for use in characterizing signals received by an antenna, the meter including:

A. a first subsystem for determining estimates of parameters associated with a direct signal component and one or more multipath signal components of the received signal, the first subsystem determining estimates for one or more of amplitude, delay and phase of the signal components;

B. a second subsystem for analyzing the parameters and determining if multipath signal components that adversely affect the processing of the direct signal components are present, the second subsystem analyzing a ratio of amplitudes that is based on the estimates of the amplitudes of the direct signal components and the multipath signal components and determining that the multipath signal components that adversely affect the processing are present if the ratio of amplitudes is consistently below a predetermined minimum value over a predetermined time period.

2. The meter of claim 1 further including a display for providing to a user an indication of the presence of the signal components that adversely affect the processing of the direct signal components.

3. The meter of claim 2 wherein the display presents a plot of one or more values associated with signal quality.

4. The meter of claim 1 wherein the second subsystem analyses the parameters associated with signals received over the predetermined time period to determine if a location is acceptable as an antenna site.

5. The meter of claim 4 wherein the second subsystem determines how far a reflector is located from the antenna based on the frequency of a sinusoid that represents the phase of one or more of the multipath signal components.

6. The meter of claim 5 wherein a user determines if the located reflector is a permanent structure to determine if the current site of the antenna is desirable as a permanent location of the antenna.

7. The meter of claim 1 wherein the second subsystem further
   i. produces minimum detectable error values for selected correlators, where the minimum detectable error value is a direct signal correlation value normalized by the corresponding correlator value of a punctual correlator,
   ii. produces minimum detectable ratio values for selected sets of correlators, where the minimum detectable ratio is the ratio of a direct signal tracking error of a set of correlators at one location and a set of correlators at a second location, and
   iii. determines the presence of signal components that adversely affect the processing of the direct signal components when one or both of the error values and ratio values associated with signals from respective satellites exceed predetermined thresholds.

8. The meter of claim 1 wherein the second subsystem determines if the current site of the antenna is a good site for the antenna by examining the trend of the ratio of amplitudes over the predetermined time period.

9. The meter of claim 1 wherein the meter determines a satellite failure when the corresponding ratios of amplitudes are negative.

10. A meter for use in characterizing signals received by an antenna, the meter including:
   A. a first subsystem for determining estimates of parameters associated with a direct signal component and one or more multipath signal components of the received signal, the first subsystem determining estimates for one or more of amplitude, delay and phase of the signal components; and B. a second subsystem for analyzing the parameters and determining if multipath signal components are present, the second subsystem
      i. producing correlation residual values for selected correlators used by the first subsystem, the second subsystem producing the correlator residual value for a given correlator by subtracting from a measured correlation value the contributions made by the direct and the one or more multipath signal components, and
      ii. determining the presence of multipath signal components, and adversely affect the processing of the direct signal components if one or more of the correlator residual values are consistently above a predetermined threshold value.

11. The meter of claim 10 wherein the second subsystem further
   iii. produces minimum detectable error values for selected correlators, where the minimum detectable error value is a direct signal correlation value normalized by the corresponding correlator value of a punctual correlator,
   iv. produces minimum detectable ratio values for selected sets of correlators, where the minimum detectable ratio is the ratio of a direct signal tracking error of a set of correlators at one location and a set of correlators at a second location, and
   v. determines the presence of multipath signal components that adversely affect the processing of the direct signal components when one or both of the error values and ratio values associated with signals from respective satellites exceed predetermined thresholds.

12. The meter of claim 11 wherein the signal components that adversely affect the processing of the direct signal components are signals associated with satellite failure, which is determined based on a combination of
   the associated minimum detectable error values and minimum detectable ratio values being higher or lower than corresponding expected values, and
   associated ratios of amplitudes, which are based on the amplitudes of the estimated direct signal components and the multipath signal components, having relatively low values.

13. The meter of claim 12 wherein the second subsystem monitors signal quality of the signals received from a given transmitting source and assigns confidence ratings to associated position measurements based on either or both of the associated ratios of amplitudes being below a predetermined minimum threshold and the corresponding correlator residuals being above an associated predetermined threshold.

14. The meter of claim 13 wherein the meter assigns a low confidence rating to the received signals that correspond to both relatively low ratios of amplitudes and relatively high corresponding correlator residuals.

15. The meter of claim 10 wherein the signal components that adversely affect the processing of the direct signals are excessive multipath signals, which are determined based on the corresponding correlator residuals being above a predetermined threshold.

16. The meter of claim 15 wherein the second subsystem further determines at what times the excessive multipath signals are present by determining when the corresponding correlator residuals fall below the predetermined threshold.

17. The meter of claim 16 wherein the second subsystem determines that a location is not acceptable as an antenna site if excessive multipath signals are present for more than a certain portion of the predetermined time period.

18. A system for use in characterizing signals received by an antenna, the system including:
  A. a signal receiver for determining estimates of parameters associated with a direct signal component and one or more multipath signal components of the received signal, the receiver determining estimates for one or more of amplitude, delay and phase of the signal components;
  B. a meter for analyzing the parameters and determining if signal components that adversely affect position measurements are present, the meter
     i. producing mimimum detectable error values for selected correlators, where the minimum detectable error value is a direct signal correlation value normalized by the corresponding correlator value of a punctual correlator,
     ii. producing minimum detectable ratio values for selected pairs of correlators, where the minimum detectable ratio is the ratio of tracking errors of correlator pairs at selected locations, and
     iii. determining the presence of multipath signal components that adversely affect the processing of the direct signal components when one or both of the error values and ratio values associated with signals from respective satellites exceed predetermined maximum thresholds or fall below predetermined minimum thresholds.

* * * * *